United States Patent
Orosz

[19]

[11] Patent Number: 6,144,852
[45] Date of Patent: Nov. 7, 2000

[54] REMOTE OFFICE ADMINISTRATIVE AND MAINTENANCE SYSTEM FOR CELL SITES IN A WIRELESS TELECOMMUNICATION NETWORK

[75] Inventor: William J. Orosz, Downers Grove, Ill.

[73] Assignee: Lucent Technologies Inc., Murray Hill, N.J.

[21] Appl. No.: 09/313,145

[22] Filed: May 17, 1999

Related U.S. Application Data

[63] Continuation-in-part of application No. 08/745,142, Nov. 7, 1996, Pat. No. 5,905,951.

[51] Int. Cl.[7] .......................... H04M 1/24; H04M 11/00; H04B 17/00
[52] U.S. Cl. .................. 455/423; 455/67.1; 455/553; 455/557
[58] Field of Search .............................. 455/9, 67.1, 67.4, 455/422, 423, 424, 426, 507, 508, 553, 557, 562; 379/339

[56] References Cited

U.S. PATENT DOCUMENTS

| | | | |
|---|---|---|---|
| 5,361,402 | 11/1994 | Grube et al. | 455/67.1 |
| 5,479,480 | 12/1995 | Scott | 455/553 |
| 5,526,398 | 6/1996 | Okada et al. | 455/426 |
| 5,703,929 | 12/1997 | Schillaci et al. | 455/423 |
| 5,710,986 | 1/1998 | Obayashi et al. | 455/553 |
| 5,793,799 | 8/1998 | Armbruster et al. | 455/553 |
| 5,794,159 | 8/1998 | Portin | 455/553 |
| 5,905,951 | 5/1999 | Orosz | 455/423 |
| 5,933,776 | 8/1999 | Kirkpatrick | 455/423 |
| 5,970,394 | 10/1999 | Arpee et al. | 455/67.1 |
| 6,011,830 | 1/2000 | Sasin et al. | 455/423 |
| 6,011,962 | 1/2000 | Lindenmeier et al. | 455/67.1 |

*Primary Examiner*—Willis R. Wolfe
*Attorney, Agent, or Firm*—Fay, Sharpe, Fagan, Minnich & McKee, LLP

[57] ABSTRACT

A system for providing a wireless connection from a cell site to its own operations and maintenance panel (OMP). A unit is built into a cell site on the radio shelf that includes features of a cellular telephone. Such unit includes a modem so that a laptop or other type of computer may be plugged in. This system operates in a plurality of mobile modes—so that it can communicate with any or all of the wireless telecommunication system types (such as AMPS, TDMA, CDMA), and frequency ranges (i.e., 850 MHZ and microwave)—and a diagnostic mode. While the system is installed, the wireless telephone unit is in the mobile mode and can communicate with another type of wireless system. However, once the system comes on line, the unit can communicate with other cell sites in the area from its own system, thus reducing the cost of maintenance. Furthermore, such a system can be used for informing the OMP of alarms such as an intruder alarm, etc. Advantageously, after installation, emergency telephone service or other directly connected telephone service, may be provided by this system. In addition, in the diagnostic mode, diagnostic routines may be run on the system.

20 Claims, 8 Drawing Sheets

REMOTE OFFICE ADMINISTRATIVE AND MAINTENANCE SYSTEM FOR CELL SITES IN A WIRELESS TELECOMMUNICATION NETWORK

CROSS REFERENCE TO RELATED APPLICATION

This application is a continuation-in-part of U.S. Ser. No. 08/745,142 to Orosz, filed Nov. 7, 1996, now U.S. Pat. No. 5,905,951, issued May 18, 1999, entitled "Remote Office Administrative and Maintenance System for Cell Sites in a Wireless Telecommunication Network".

TECHNICAL FIELD OF THE INVENTION

This invention relates to the area of wireless telecommunications, and, more specifically, to an apparatus to aid in installation and maintenance of cell sites in such wireless communication networks. While the invention will be thus described with specific reference thereto, it will be appreciated that the invention may have usefulness in other fields and applications.

BACKGROUND OF THE INVENTION

Recently, there has been an exponential growth in consumer use of wireless telecommunications systems. To meet such consumer demand, telephone operating companies that provide wireless telecommunication services are installing and upgrading their physical plant at a rate rarely seen in telecommunications history. Furthermore, regions or countries that do not have a wire-line telecommunication system infrastructure are "leapfrogging" technology, by moving directly into wireless telecommunications which can provide a wider area of service coverage with less capital investment.

It is known in the art, however, that installation and maintenance of a cell site in wireless telecommunication systems is an expensive proposition. Turning now to FIG. 1, a typical scenario of an installation and maintenance of a cell site is shown. In this scenario, there is a personal communication system (PCS) 102 being installed in an area that is currently served by an advanced mobile phone service (AMPS) analog system 104, as is known in the art. This installation scenario occurs, for example, in urban areas where such AMPS systems as 104 are overloaded and there are delays in receiving service. A PCS system, such as 102, can help relieve such congestion by providing service at different frequency spectrums or by providing digital service, again at various frequency spectrums.

As is known in the art, an AMPS system comprises a mobile switching center (APX-MSC) 106, connected to a plurality of cell sites 108. Each cell site is connected to an antenna 110. Cell sites 108-1 through 108-N are connected to the mobile switching center (MSC) 106, via a plurality of trunks 112. Cell site 108-1 controls telecommunications among mobile units within the range of antenna 110 and connects such calls via trunk 112 to MSC 106. MSC 106 is connected via a plurality of trunks 114 to the public switched telephone network (PSTN) 116. PSTN 116 comprises a plurality of local, long distance, and tandem switches, as is known in the art.

In the scenario of FIG. 1, a personal communications service (PCS) 102 is being installed in the same general geographic location as AMPS system 104. PCS 102 comprises a PCS switching center (PCSC) 120, which provides a connection 121 to PSTN 116, switching, and other functionality similar to MSC 106. PCSC 120 is connected to a plurality of cell sites 122-1 through 122-N. Each cell site is connected to an antenna 124, which, as in the prior art, facilitates communication with wireless telephones at pre-assigned frequencies.

In order to install, test, and maintain PCS cell sites, such as cell site 122-1, the installer must have access to the control system of PCSC 120, known as the operation maintenance panel (OMP) 126. The installer needs to be able to perform functions such as run diagnostics on various components, bring the cell site into and out of service, and perform other functions as known in the art. In the prior art, cell site 122-1, as it is being installed, is connected to one or two telephone lines (POTS) 128 and 130, which connect cell site 122-1 to a local switch 132 of the local service provider. The installer can then plug in a telephone and/or a computer, such as a laptop computer (or both) to the telephone network, as is known in the art. Local switch 132 is connected to the public switched telephone network (PSTN) 116, which connects to a further local switch 134. Local switch 134 is connected to OMP 126 of the PCSC 120. The installer can then exercise the equipment by voice command to a person at OMP 126, or via remote control of the cell site through a PC. Hard wired connections, such as 128 and 130 are expensive and, in most cases, are permanent. Such wire-line connections require the PCS service provider to incur at least one, and usually two, line charges per cell. Thus, as more and more cell sites overlap, i.e., multiple service providers providing different frequency and different types (analog and digital) services, the higher the physical plant cost.

One partial solution to this problem is also illustrated in FIG. 1. A personal computer, for example a laptop 136, may be equipped with a cellular modem that operates with a currently existing analog (or digital) system that is already operating in that area. In this instance, signals from PC 136 are received at analog cell site 108-1, and are switched at APX-MSC 106 through PSTN 116 the local switch 134, and finally to OMP 126. While this system reduces the cost of physical plant and wires in the field, it incurs the additional cost of maintaining at least one cellular telephone number on analog system 106. Such maintenance of telephone numbers may be as costly, or more so, than a hard wire system, as described above.

Therefore, a problem in the art is that there is no low cost system for providing a connection from a cell site to its own operation and maintenance panel without incurring overhead expenses, possibly from competing service providers. It, of course, would be desirable to overcome these shortcomings of the known systems. It would also be desirable to have a system whereby the components that provide solutions to the installation problems noted above also function to accommodate other features of the system.

As such, the present invention contemplates a new and improved remote office administrative and maintenance system for cell cites in a wireless telecommunication network which resolves the above referenced difficulties and others.

SUMMARY OF THE INVENTION

Problems are solved and technical advances are achieved in the art by a system and method for providing a wireless connection from a cell site to its own operations and maintenance panel (OMP). A unit is built into a cell site on the radio shelf that includes features of a cellular telephone. This system operates in both, a plurality of mobile modes— so that it can communicate with any or all of the wireless telecommunication system types (such as AMPS, TDMA, CDMA), and frequency ranges (i.e., 850 MHZ and microwave)—and a diagnostic mode to accomplish necessary diagnostic routines that are well known in the art. The selection of the diagnostic or the mobile mode may be predetermined or accomplished by the user.

In one aspect of the invention, while the system is installed, the wireless telephone unit is placed in a mobile mode and can communicate with another type of wireless system. However, once the system comes on line, the unit can be switched to communicate with other cell sites in the area from its own system, thus reducing the cost of maintenance. Furthermore, such a system can be used for informing the OMP of alarms such as an intruder alarm, etc. Advantageously, after installation, emergency telephone service or other directly connected telephone service, may be provided by this system. In addition, in the diagnostic mode, the wireless unit provided can facilitate the necessary diagnostic functions of the cell site that has been installed.

In another aspect of the invention, the entire system is "mobile" to provide a mobile cell site.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those of skill in the art.

BRIEF DESCRIPTION OF THE DRAWINGS

The present invention exists in the construction, arrangement, and combination of the various parts of the device and/or steps of the method whereby the objects contemplated are attained as hereinafter more fully set forth, specifically pointed out in the claims and illustrated in the accompanying drawings, in which:

DETAILED DESCRIPTION OF THE PREFERRED EMBODIMENTS

Figure 1:
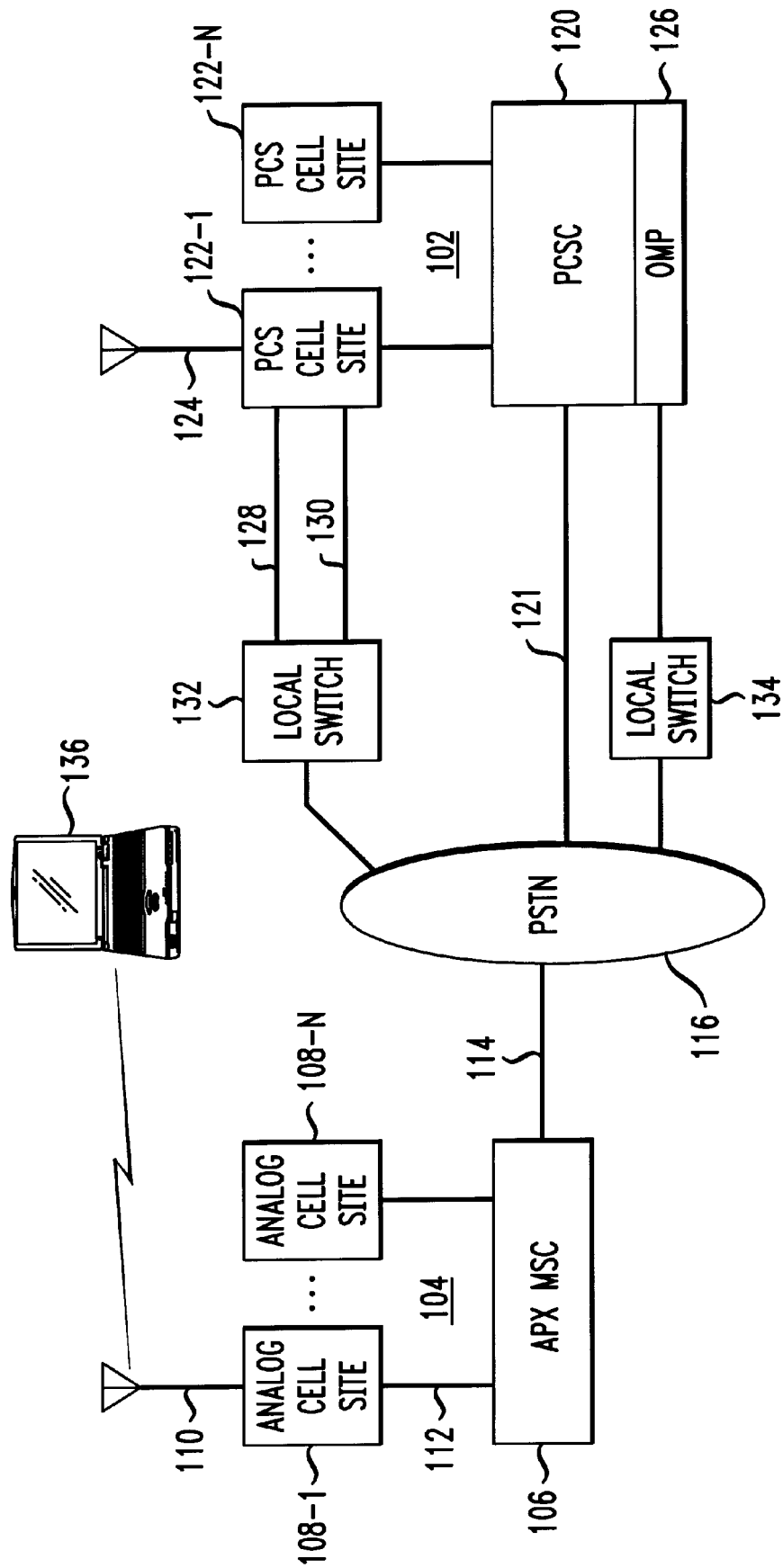
FIG. 1 is a block diagram of a prior art configuration of maintenance of cell sites.
Figure 2:
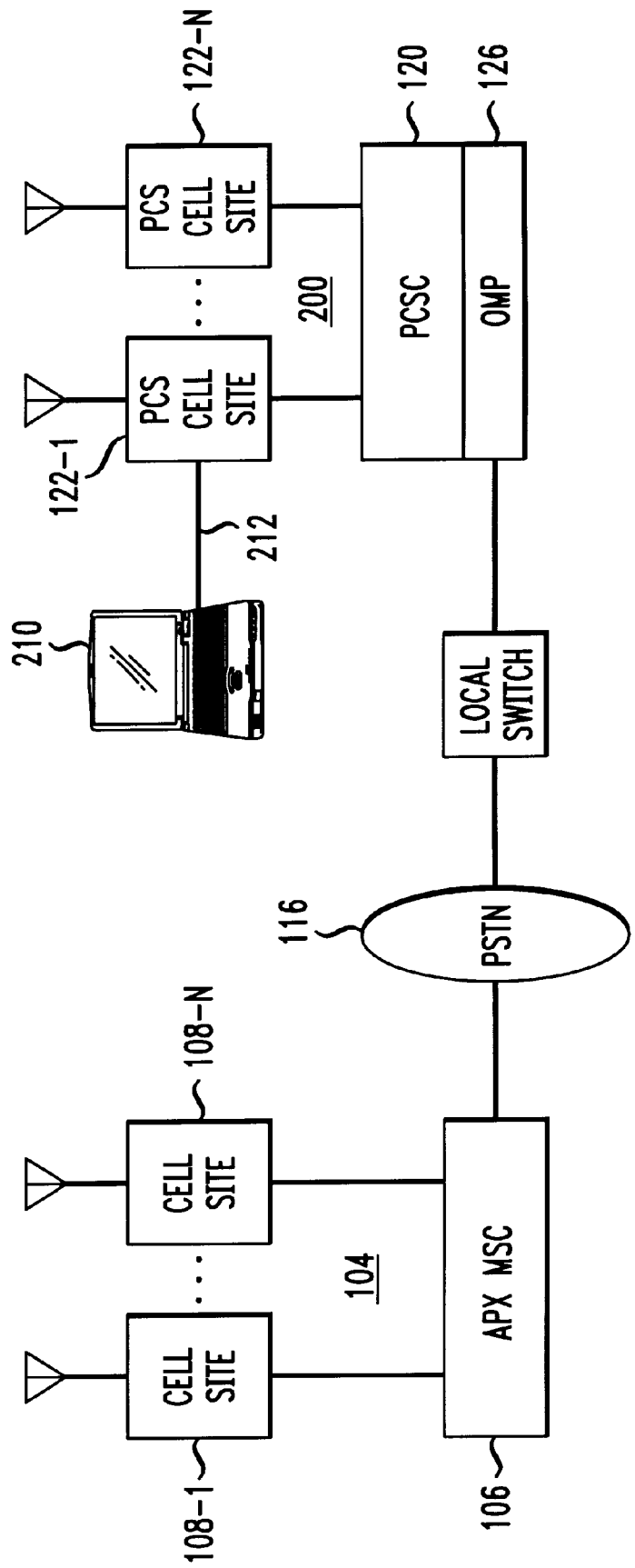
FIG. 2 is a block diagram of the current invention of two cellular systems using the current invention.

Referring now to the drawings wherein the showings are for purposes of illustrating the preferred embodiments of the invention only and not for purposes of limiting same, FIGS. 2 through 8 provide illustrations for describing the present invention. In this regard, FIG. 2 illustrates a block diagram in which an exemplary embodiment of this invention is practiced. FIG. 2 illustrates an analog wireless system 104, comprising an APX-MSC 106 and cell sites 108-1 through 108-N as described previously in accordance with FIG. 1. PCS system 200 comprises PCSC 120, PCS cell sites 122-1 through 122-N and OMP 126. PCS system 200 is, according to this exemplary embodiment, being installed. As stated above, in the prior art, telephone lines normally would be strung from a local switching system to each PCS cell site in order to facilitate craft installation of the cell site. Alternatively, a PC such as 210 requires a wireless modem and a permanent presence on analog system 104.

According to this invention, neither a wire-line connection nor a permanent presence in the analog system is required. PC 210 is connected to cell site 122-1, for example, via a standard interface connection 212. PC 210 is connected to a remote OA&M wireless telephone, according to this invention, incorporated in cell site 122-1. As will be discussed further below, the wireless telephone according to this embodiment can communicate with analog system (AMPS system) 104. However, the wireless telephone does not have to have a permanent presence in AMPS system 104; it can have a temporary telephone number or even a roving presence in analog system 104. Then, when PCS system 200 goes on line (or one or more cell sites are in operation), PC 210 can communicate with OMP 126 via its own system, eliminating the need for and reliance on analog system 104. Thus, the advantages of this invention may be realized by an economical connection between the craft in the field and the OMP 126.

Figure 3:
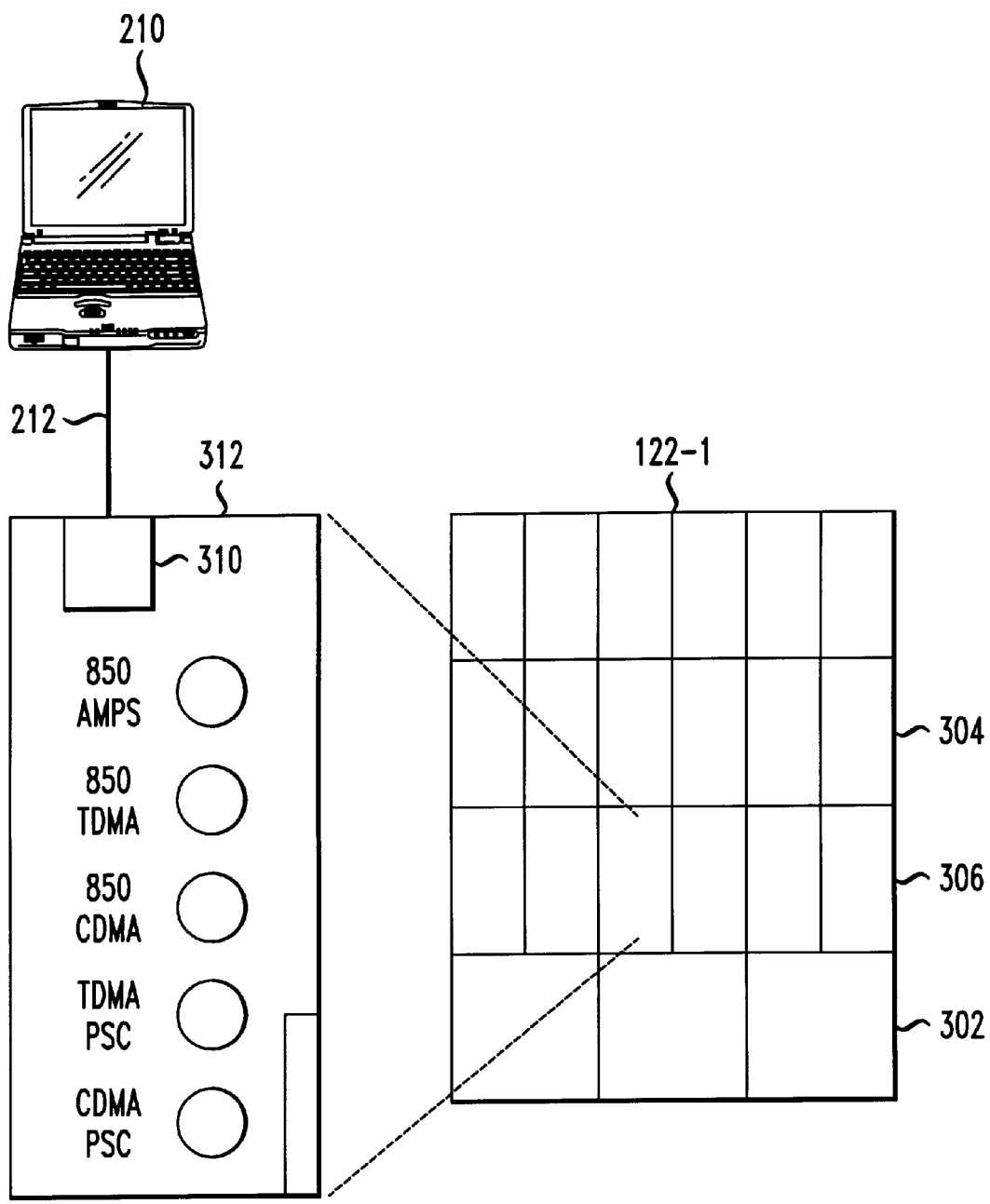
FIG. 3 is a diagram of the current invention in the context of a cell site of FIG. 2.

Turning now to FIG. 3, an exemplary embodiment of a one-card OA&M wireless telephone according to this invention in cell site 122-1 is shown. Cell site 122-1 comprises a frame with a plurality of shelves, each of which has a particular function; for example, power supply 302, trunk connections 304 between the cell site and PCSC 120, and radios 306 for communicating with wireless telephones. On the same shelf with the wireless radios 306, and, drawing power from the same power source, is a wireless OA&M telephone 312, according to an exemplary embodiment of this invention. As illustrated in FIG. 3, laptop computer 210 is connected via cable 212 to jack 310 of wireless telephone 312. According to this invention, this wireless radio may operate on a plurality of channels, for example, 850 MHZ AMPS, 850 MHZ time division multiple access (TDMA), 850 MHZ code division multiple access (CDMA), TDMA PCS, and CDMA PCS, as are all known and described in the art. Such multi channel radios are described in Scott, U.S. Pat. No. 5,479,480, which is assigned to the assignee of this invention and incorporated by reference. According to this embodiment of this invention, when a connection is desired, telephone 312 may try a preprogrammed sequence of the system to try and establish a telephone connection. Alternatively, the user of laptop computer 210 may specify which type of communication to establish. In this manner, the best communication available to that cell site may be selected.

Figure 4:
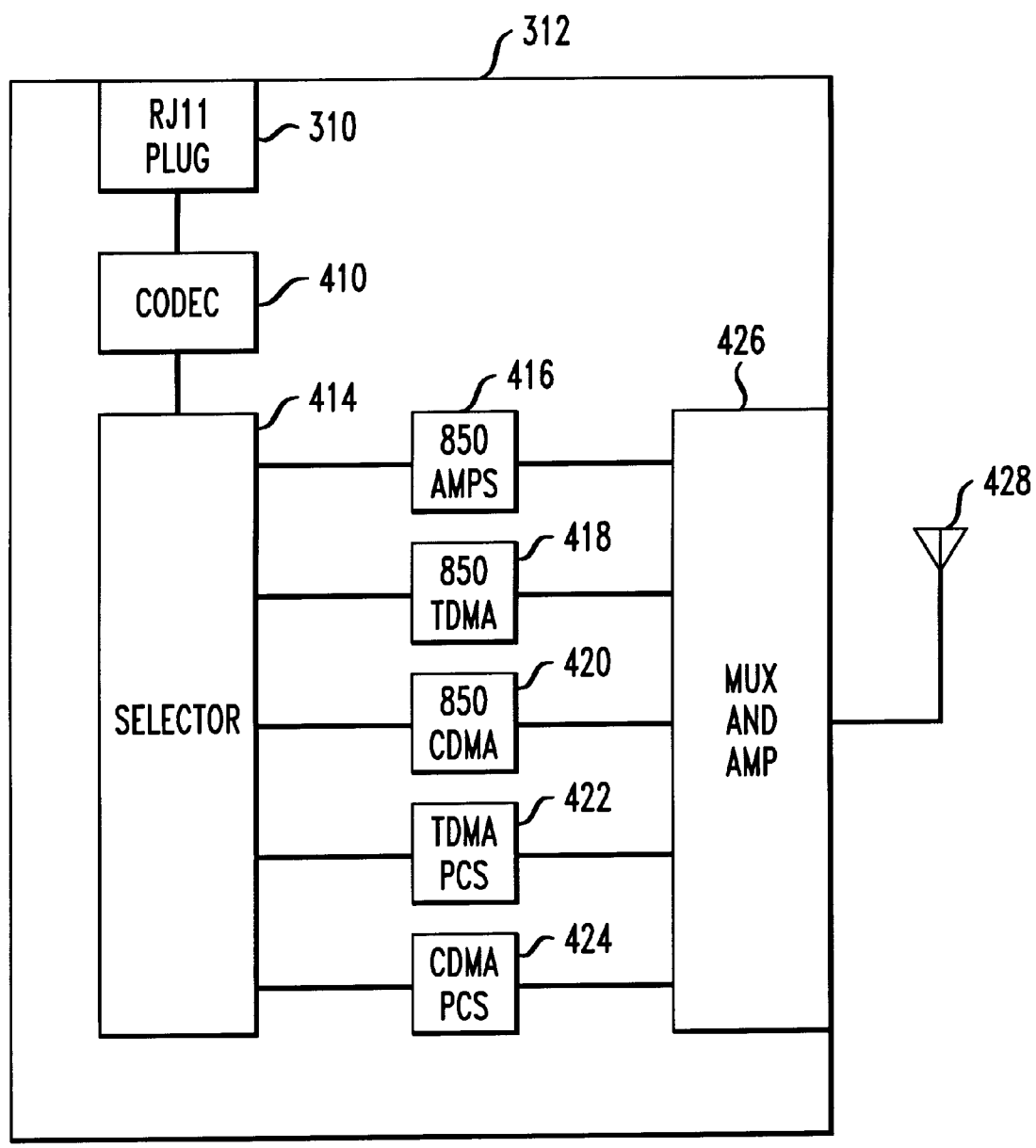
FIG. 4 is a block diagram of a remote office administration and maintenance system for a cell site in a wireless communications telephone network, according to this invention.

Turning now to FIG. 4, a block diagram of the wireless radio 312 of FIG. 3 is illustrated. Cellular telephone 312 comprises a plug 310 for interfacing a laptop computer such as 210 (FIG. 3). Plug 310 is connected to a CODEC 410 which provides standard telephone interface to the wireless telephone set. CODEC 410 is connected to selector 414 which selects among the various interfaces needed for the different air interfaces 416 through 424. All of the air interfaces are connected to a multiplexer and amplifier for receiving the different types of signaling which in turn is connected to an antenna 428.

In the embodiments described thus far, the wireless radio 312 is operable primarily to facilitate installation of the cell site. However, cell sites (e.g. CDMA cell sites) exist that incorporate mobile phone components therein for the additional purposes of facilitating certain diagnostic functions that are well known to those of skill in the art.

According to the present invention, these existing mobile phone components are adapted and/or configured to operate in a mobile mode as well. Thus, the mobile phone components, according to the selection of a craft or predetermined criteria, can operate in either a mobile mode (to facilitate installation) or a diagnostic mode (to facilitate conducting diagnostic routines).

Several advantages are thus realized by the present invention. For example, by providing dual mode operation, the use of mobile phone components within a cell site is maximized. In addition, this type of arrangement provides a convenient connection of the mobile phone components to the hardware (i.e. coaxial cabling) of the antenna system of the cell site. Thus, the same rf path through the system is utilized in either mode.

Figure 5:
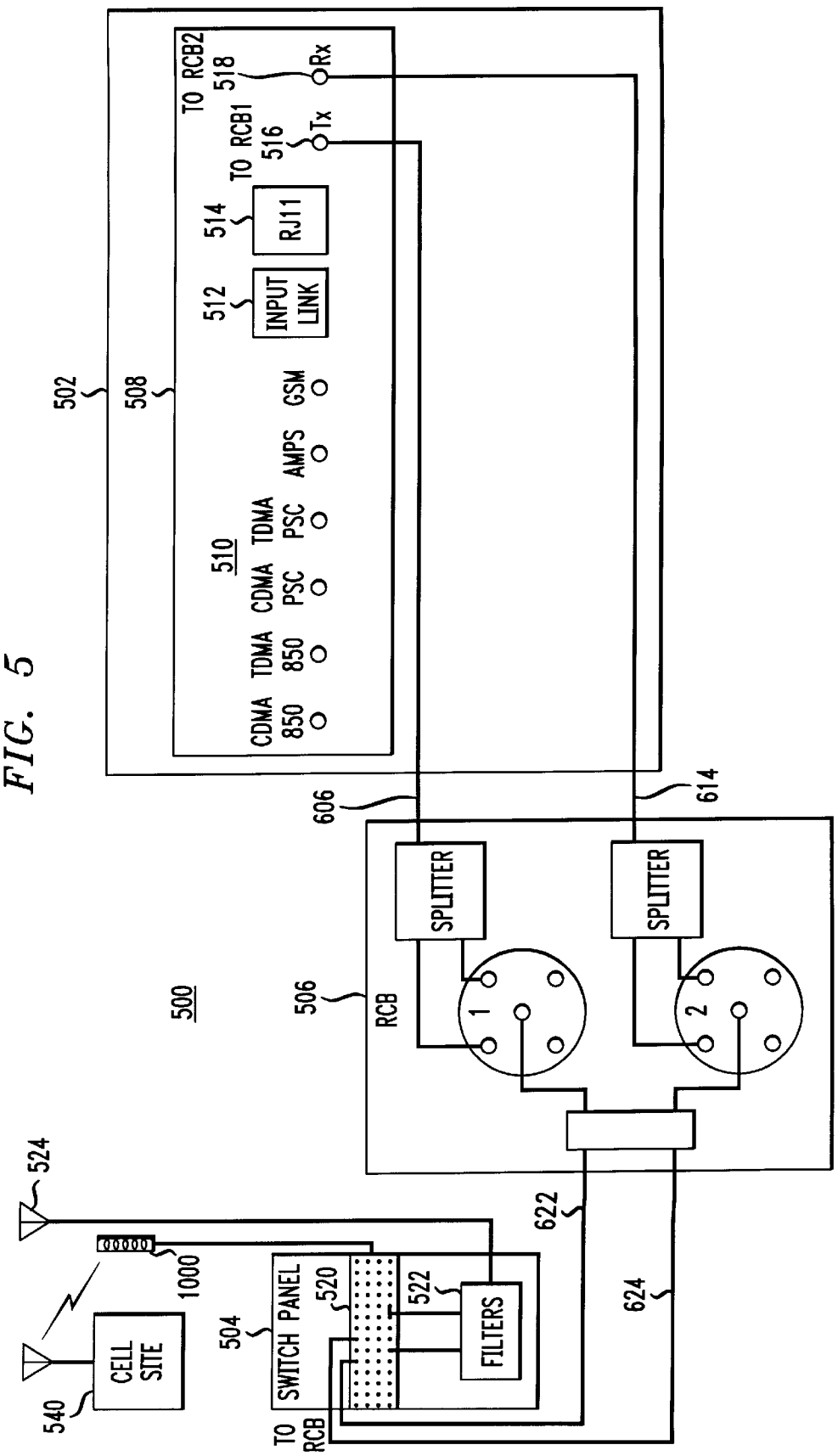
FIG. 5 is a block diagram of an alternative embodiment according to this invention.

More particularly, as shown in FIG. 5, the cell site 500 is comprised of a miscellaneous frame 502, an antenna interface unit (AIF) 504 and a radio control block (RCB), or radio frequency (RF) switch device, 506. As shown, the miscellaneous frame 502 includes a wireless telephone 508. The frame 502 is depicted as a distinct element in FIG. 5; however, it is to be appreciated that the frame 502 may well be incorporated into the plurality of radio shelves, such as those shown in FIG. 3.

The wireless telephone 508 is similar to the telephone 312 of FIGS. 3 and 4 and includes a plurality of channels, or a plurality of wireless system families or technologies, 510 for different transceiver types. As noted above, multi-channel radios are well-known and examples of the variety of channels, or variety of families, corresponding to the different transceivers include GSM, AMPS, TDMA PCS, CDMA PCS, TDMA850 and CDMA850. Note that the telephone 508 includes accommodations for GSM, or Global System for Mobile telecommunications, unlike the telephone 312.

Wireless telephone 508 also includes a control input link, or control interface, 512 and a telephone jack 514. Preferably, the control input link 512 is one of suitable form well known in the art to connect the cell site to the telephone 508. The control input link 512 serves a variety of functions including facilitating automatic dial, switching from mobile mode to diagnostic mode, and switching the mobile telephone 508 from a state of scanning the plurality of channels to locate a signal upon which to "lockon" to a state of "locking on" to a preselected channel, i.e. the channel associated with the provider installing the cell site. The telephone jack 514 is an RJ11 jack that is likewise well known in the art.

Also included in the telephone 508 is a connection terminal 516 for a transmission line 606 connecting to the radio control block 506 and a connection terminal 518 for a receiver line 614 connecting to the radio control block 506. In one embodiment, the telephone 508 is arranged in the cell site to provide a direct connection with the system bus (as shown hereafter in FIG. 6) within the cell site. Thus, the telephone 508 has an address on the bus and it can communicate data.

A radio switch panel 520 includes a plurality of input and output connections which are in operative communication with antennas 524 and 1000. The antenna 524 is the main antenna of the cell site while the antenna 1000 finds particular application in the mobile mode according to the present invention. The antenna 1000 is positioned to communicate with other cell sites, e.g. cell site 540. It is to be appreciated that those skilled in the art will have a working understanding of the function and interaction of the components of the radio switch panel as well as other portions of the cell site described herein that are well known in the art, such as filters 522. Briefly, however, the switch panel 520 switches the connection of the rf-path through the cell site between the antenna 524 (for diagnostic mode) and the antenna 1000 (for mobile mode), depending on the mode selected.

Figure 6:
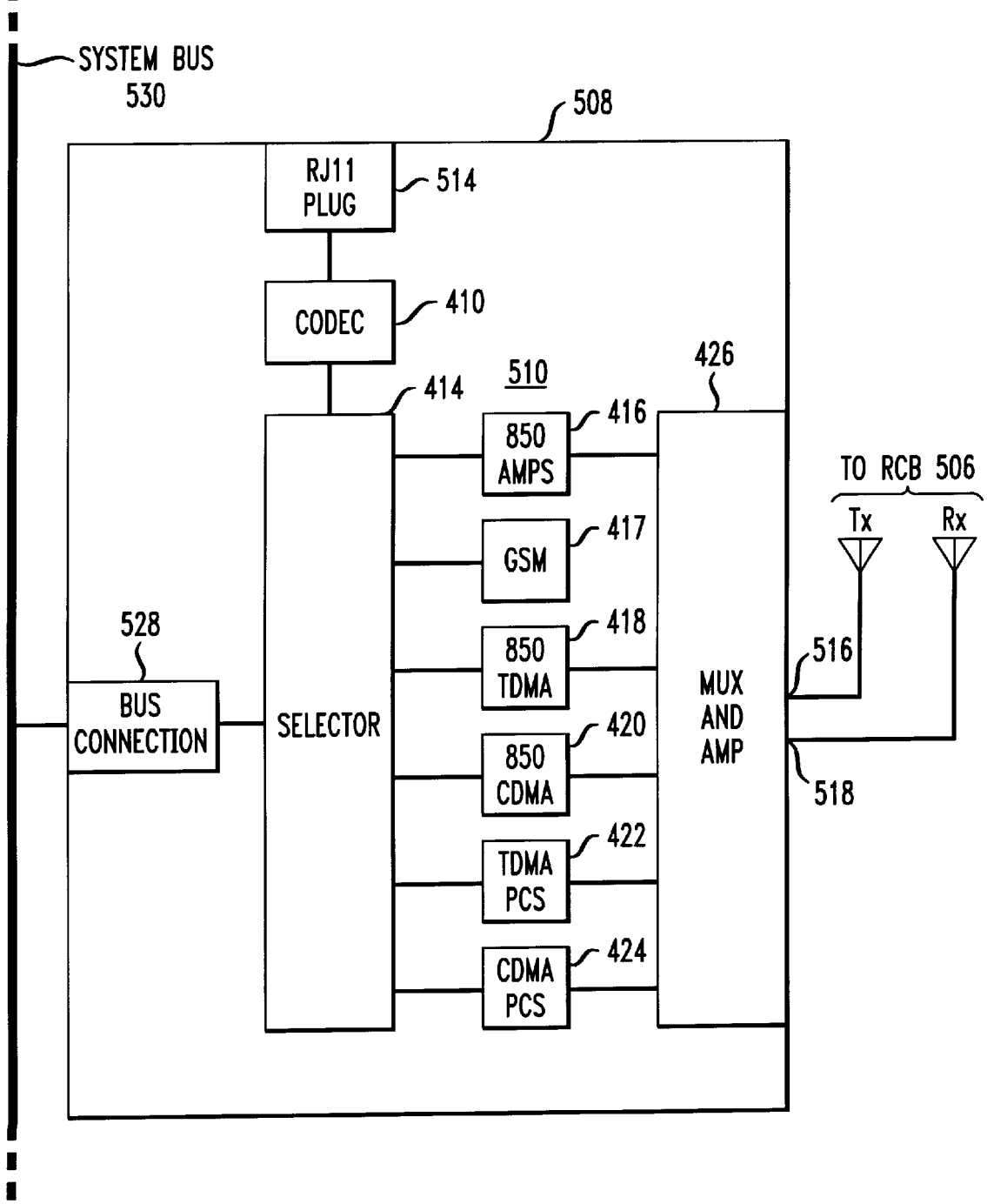
FIG. 6 is a block diagram illustrating a device according to the present invention.

With reference to FIG. 6, the wireless telephone 508 in a preferred embodiment is shown. As noted above, the telephone 508 is substantially similar to the telephone 312; however, differences nonetheless exist. For example, the telephone 508 is preferably disposed on the system bus of the cell site. Therefore, a bus connection 528 is included to connect the phone 508 to the system bus 530—which is suitably disposed in a convenient location in the cell site as those of skill in the art will appreciate. In addition, the multiplexor and amplifier 426 connects to the radio control block 506 through the terminal connections 516 and 518 as shown. Further, an additional air interface 417 for the GSM channel is illustrated.

Figure 7:
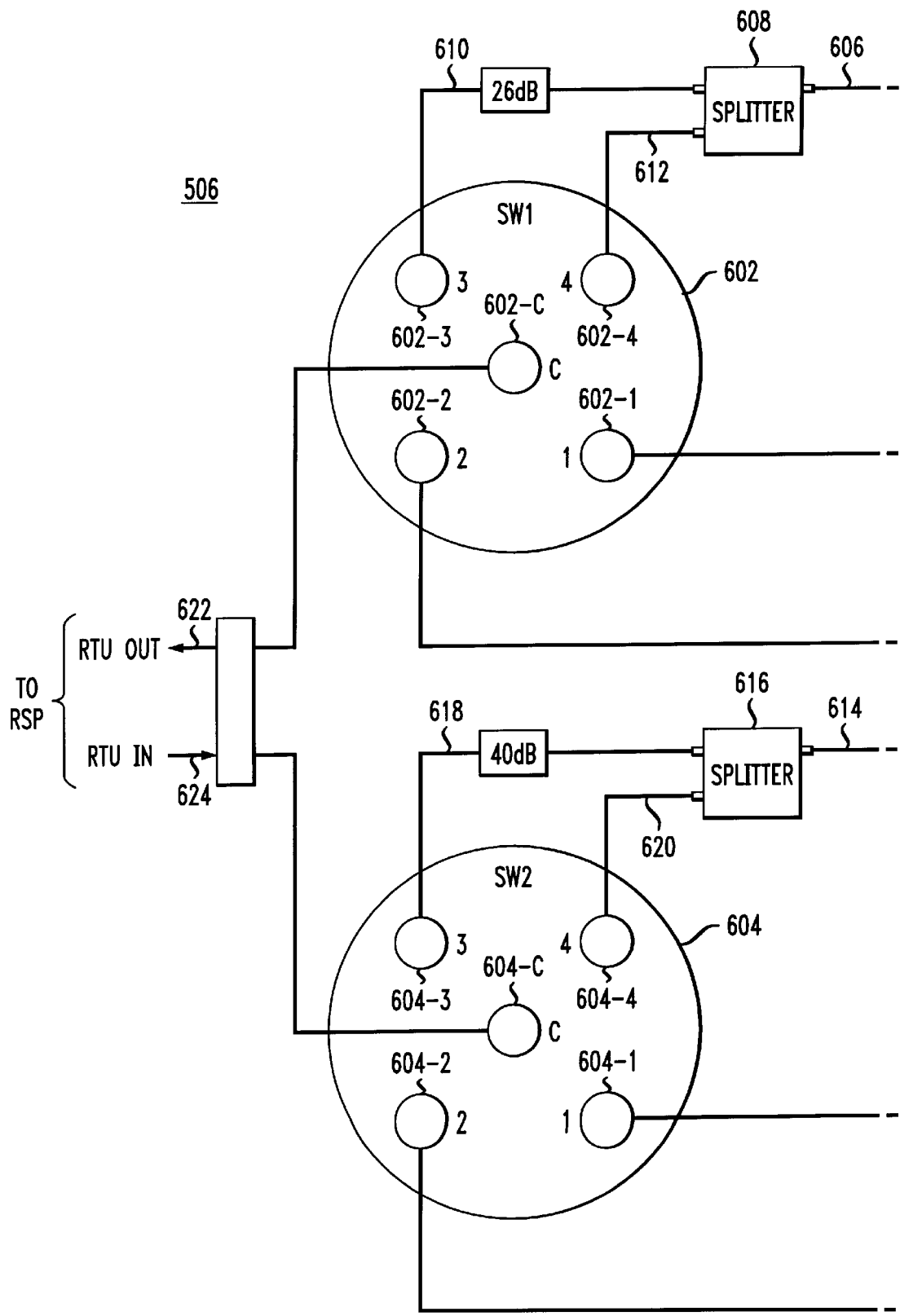
FIG. 7 is a schematic illustration of the radio control block of FIG. 5 of the present invention; and, FIG. 8 is an illustration of an exemplary use of the present invention.

Referring now to FIG. 7, the radio control block 506 is shown in greater detail. As shown, the radio control block 506 includes a first radio frequency (RF) switch 602 having four (4) peripheral ports, or terminals, 602-1, 602-2, 602-3, and 602-4 and a center port 602-C. The radio control block 506 further includes a second radio frequency (RF) switch 604 which likewise includes four (4) peripheral ports, or terminals, 604-1, 604-2, 604-3, and 604-4 and a center port 604-C.

As shown, port 602-3 and 602-4 of the first switch 602 are connected to transmission line 606 of telephone 508 through an rf splitter box 608. A connection line 610 having an attenuation of 26 dB connects port 602-3 to the splitter box 608 and a low attenuation connection line 612 connects port 602-4 to the splitter box 608. Likewise, ports 604-3 and 604-4 are connected to receiving line 614 of telephone 508 through an rf splitter box 616. Port 604-3 is connected to the box 616 through a connection line 618 having an attenuation of 40 dB while port 604-4 is connected to the box 616 via a low attenuation connection line 620. As shown, both transmission line 606 and receiving line 614 are connected to the wireless telephone 508 by means well-known to those skilled in the art.

It is to be appreciated that attenuated connection lines 610 and 618 are used in the diagnostic mode for purposes that will be appreciated by those skilled in the art. The lines 612 and 620 are used in the mobile mode so that the telephone 508 achieves the strongest possible signal.

Also shown is a radio test unit (RTU) output terminal 622 and a radio test unit (RTU) input terminal 624. Both of these terminals connect the radio control block 506 to the radio switch panel 520.

In operation, the cell site described in FIGS. 5–7 operates in two primary modes, as described above. First, when first switch 602 and second switch 604 are set to ports 602-3 and 604-3, respectively, diagnostic routines suitable for the cell site are implemented. These routines, which are used, for example, for maintenance and for testing call processing and RF paths within the cell site, are well known in the art. Second, when the radio control block switches the first switch 602 and the second switch 604 to ports 602-4 and 604-4, respectively, then the cell site is operated to function as described in connection with FIGS. 2–4. That is, the wireless telephone 508, which is equipped for multiple technology use, either searches (by scanning available channels) for the strongest RF signal to register and gain appropriate service or is instructed to "lock-on" to a particular services to provide dial-up service to the RJ11 interface. The radio switch panel thus connects the mobile telephone 508 to the antenna 1000 shown in FIG. 5. The advantage to connecting the mobile phone 508 to the antenna 1000 through the existing rf path, or coaxial cabling, of the existing antenna system is that the antenna 1000 is able to be positioned in a better physical location, i.e. on antenna 524, for communication. In addition, because an existing rf path is used, less cost and less field modifications are required.

The "mobile mode" and "diagnostic mode" are mutually exclusive. The radio control block selects the mode of operation based on instructions received from the user and/or predetermined criteria such as a recent change/verify. If, for example, the instructions are received from the user, such instructions are preferably input using a PC (such as PC 212 of FIG. 2) through the control input terminal 512 shown in FIG. 5 or via the maintenance control center (MCC) of the cell site, such as the OMP 126 shown in FIGS. 1 and 2.

It will be recognized by those skilled in the art that the advantages of a system incorporating the principles of the present invention will result in a vastly improved system having wide application. For example, as alluded to above, the arrangement of the preferred embodiments allows for convenient access and/or direct connection to a system bus within the cell site. As such, the system can be used to establish a mobile cell site via a wireless data link (as described in connection with FIG. 8), general purpose integrated testing (GPITS) can be accomplished, real time RF analysis can be conducted, special RF studies can be devised, and/or real time effects of Recent Change/Verify (RCV) parameter changes can be detected. Further, alarms at the cell site can be not only detected but analyzed by way of video, etc. because the invention provides a mobile phone within the cell site. In addition, intruder alarms can be activated/deactivated by a technician calling the mobile telephone in the cell site through a series of key punches from his/her phone.

With respect to the provision of a mobile cell site, a wide variety of specific applications of the invention are contemplated. In particular, where an internal wireless private branch (PBX) system is implemented to allow mobile calls within the mobile cell site, use at sporting events (for a security system with point-to-point communications), the stock exchange, or horse racing events (for placing bets) are exemplary.

Figure 8:
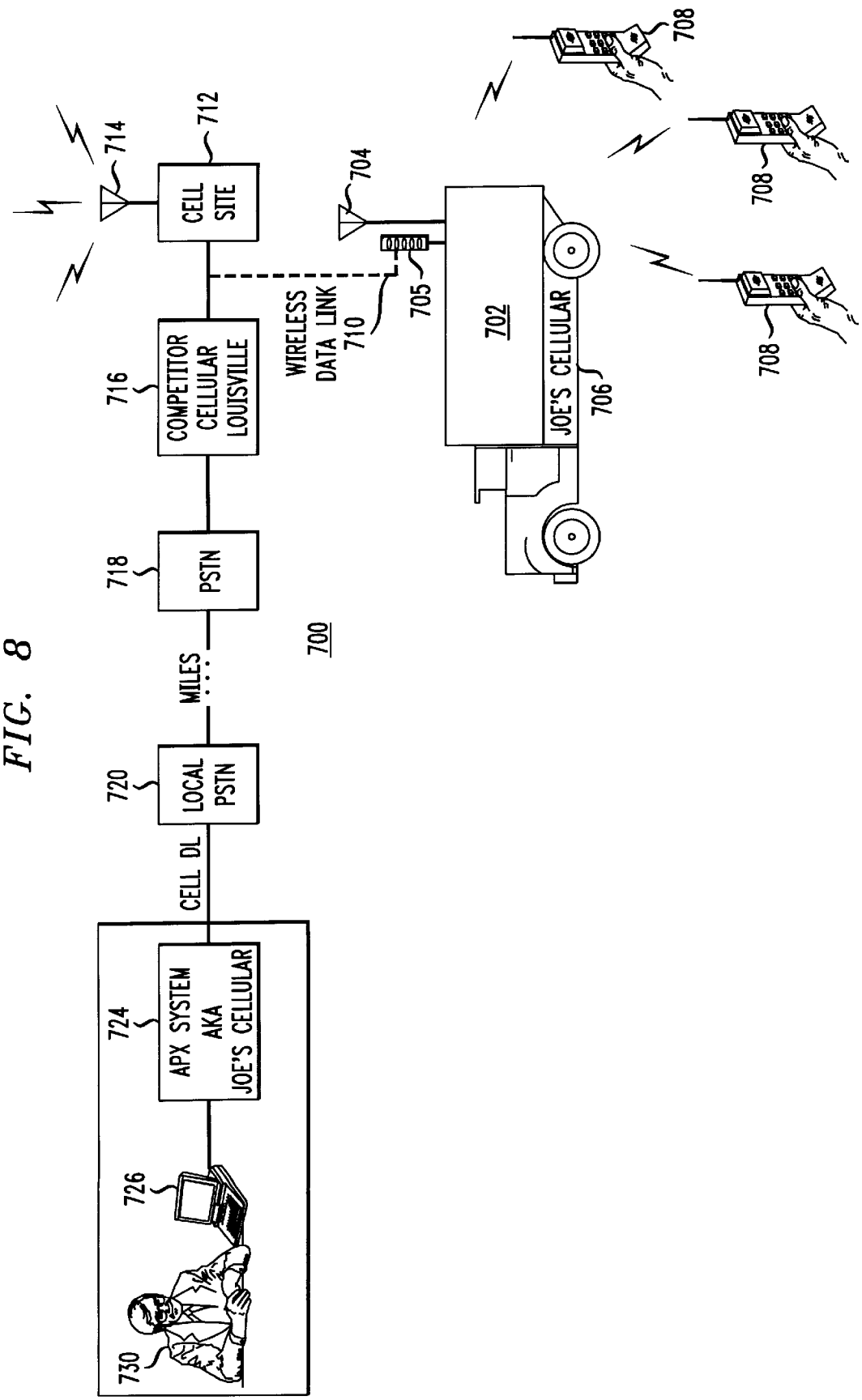

As an example, referring now to FIG. 8, a system 700 is shown which serves as a remotely controlled, local communication network established via a wireless data link established and maintained during the mobile mode of operation. The system 700 includes a mobile cell site 702 having antennas 704 and 705 (which is optional depending on the selected embodiment) attached thereto and being transported on a cellular provider truck 706 from location to location. Of course, any suitable device for conveying the cell site will suffice, including conveying devices that may be integral with the structure of the cell site. As shown, a plurality of mobile phones 708 are in communication with the cell site 702 to form the above mentioned internal wireless private branch exchange (PBX) system. Cell site 702 is also linked by a wireless data link 710 to an established cell site 712 having an antenna 714. Cell site 712 is in communication with a cellular switch 716, which is connected to a public switched telephone network 718. The public switched telephone network 718 is, in turn, in communication with a local public switched telephone network 720 which is connected to a wireless communication system such as an Autoplex® (or APX) system serving as a remote control center 724. Of course, the control center 724 is connected to a PC 726 of the cellular provider which can be used to remotely monitor, maintain, or facilitate operation of the mobile cell site 702, as will be appreciated by those skilled in the art.

Once the truck/mobile cell site 706/702 powers up the system, the mobile phone within the cell site registers on the host, or visited, system (e.g. via established cell site 712). That registration sends a message back to the control center 724. A technician 730 can then call the mobile phone unit within the cell site 702. When the phone within the cell site answers, data then begins to be exchanged between the control center 724 and the cell site 702 via a now established wireless data link as shown. It is to be appreciated that the wireless data link is maintained only while the mobile telephone within the cell site is operating in the "mobile mode." Of course, as shown by the dashed line, the antenna 705 may alternatively be used (similar to the antenna 1000) to facilitate the wireless data link in one embodiment of the invention.

In operation, the system 700 offers wireless data links to allow for mobility of the cell site. This utilizes the principles of the present invention and has a number of practical applications, examples of which are noted above, that will be appreciated by those skilled in the art upon an understanding of the present invention.

To implement the system of FIG. 8 using the principles of the present invention, it is recognized that a variety of practical considerations and preferences should be taken into account. These, of course, will be appreciated by those skilled in the art and include without limitation the following:

1) The wireless datalink 710 is preferably attached from the mobile telephone in the cell site to a DFI (Digital Facilities Interface) unit, which is typically used on the cell site 702 to support the interface of the cell site trunks and datalinks, as those skilled in the art will appreciate.

2) The spectrum used to support the mobile to mobile calls of phones 708 on the cellular provider's system, i.e. "Joe's Cellular System" (truck system), is preferably a reserved spectrum that is used only by the provider. Preferably, this spectrum would be reserved for such purposes, e.g., disaster relief, special sporting events, etc.

3) Autonomous registration is preferably used when the provider's system is powered. The Mobile Directory Number (DN) preferably belongs to "someone" or some system. Preferably, the cellular provider would reserve a number of DN's on its home system that would be assigned/used by the mobile cell sites in the field, and each visited cellular system (e.g. Louisville Cellular) would automatically know, via the mobile's NPA-NXX, to whom the mobile belongs. Billing would then be billed by the host (e.g. Louisville cellular) to the cellular provider at home base.

4) Mobiles 708 that are operating at a host site preferably only make mobile to mobile calls. To do so, a DFI on the cell site that would allow switching between DS0 time slots on the same DFI would preferably be implemented.

5) Special billing would have to be made available so the cellular provider, e.g. "Joe's Cellular System", can differentiate the cost of mobiles 708 on the system of the truck 706 from mobiles in the provider's "home" system.

6) Filters on the provider's cellular system would have to be made to filter out all other frequencies, except those being used by itself.

7) The bandwidth/baud rate of the wireless datalink 710 is preferably sufficient to handle all overhead messages usually communicated to and from a cell site.

8) Preferably, error checking algorithms are implemented to overcome a "noisy" or "spotty" wireless datalink.

It is to be understood that the above described embodiment is merely an illustrative principle of the invention and that many variations may be devised by those skilled in the art without departing from the scope of the invention. It is, therefore, intended that such variations be included within the scope of the claims.

The invention claimed is:

1. A wireless remote office maintenance and administration system for use in installing and maintaining a wireless cell site having an antenna system connected thereto, the system comprising:
   a mobile telephone unit having
      a control input for receiving control signals for determining whether a mobile mode or a diagnostic mode is implemented,
      a plurality of wireless transceivers corresponding to a plurality of wireless system types, each communicating with a different type of wireless telephone during the mobile mode,
      a selector for selecting one of said plurality of wireless transceivers for a specific communication function during the mobile mode, and
      a multiplexer connected to said plurality of wireless transceivers; and,
   a radio control block connected to the multiplexer and having a first switch and a second switch,
      wherein the first switch includes a plurality of ports and the second switch includes a plurality of ports, and
      further wherein at least two of the plurality of ports of the first switch are connected to a transmission line of the mobile telephone unit through a first splitter box and at least two of the plurality of ports of the second switch are connected to a receiving line of the mobile telephone unit through a second splitter box.

2. The system as set forth in claim 1 further comprising means to move the system from location to location.

3. The system as set forth in claim 1 wherein the mobile telephone unit connects to the antenna system through the transmission and receiving lines and selected ports.

4. The system as set forth in claim 3 wherein the mobile telephone unit connects to a second antenna through the antenna system.

5. A wireless remote office maintenance and administration system for use in installing and maintaining a wireless cell site having an antenna system for an antenna connected thereto, the system comprising:
   a mobile telephone unit having
      a control input for receiving control signals for determining whether a mobile mode or a diagnostic mode is implemented,
      a plurality of wireless transceiver means, each communicating with a different type of wireless telephone during the mobile mode,
      a selector means for selecting one of said plurality of wireless transceiver means for a specific communication function during the mobile mode, and
      multiplexer means connected to said plurality of wireless transceiver means; and,
   a radio frequency switch device.

6. The system as set forth in claim 5 further comprising means to move the system from location to location.

7. The system as set forth in claim 5 wherein the radio frequency switch device connects to the multiplexer means and includes a first switch and a second switch.

8. The system as set forth in claim 7 wherein the first switch includes a plurality of ports and the second switch includes a plurality of ports.

9. The system as set forth in claim 8 wherein at least two of the plurality of ports of the first switch are connected to a transmission line through a first splitter box and at least two of the plurality of ports of the second switch are connected to a receiving line through a second splitter box.

10. The system as set forth in claim 9 wherein the transmission line and receiving line connect to the multiplexer means of the mobile telephone unit.

11. The system as set forth in claim 10 wherein the mobile telephone unit connects to the antenna system through the transmission and receiving lines amd selected ports.

12. The system as set forth in claim 11 wherein the mobile telephone unit connects to a second antenna through the antenna system.

13. A wireless cell site system including a wireless cell site having an antenna system for an antenna and a remote control center, the system comprising:
   a means for conveying the wireless cell site from location to location;
   a first mobile telephone unit disposed within the cell site having
      a control input for receiving control signals for determining whether a mobile mode or a diagnostic mode is implemented,
      a plurality of wireless transceivers corresponding to a plurality of channels, each communicating with a different type of wireless telephone during the mobile mode,
      a selector for selecting one of said plurality of wireless transceivers for a specific communication function during the mobile mode, and
      a multiplexer connected to said plurality of wireless transceivers;
   a radio control block connected to the multiplexer and disposed within the cell site;
   a plurality of second mobile telephone units positioned to communicate with the cell site; and,
   a means for establishing a wireless data link between the cell site and the remote control center.

14. The system as set forth in claim 13 wherein the plurality of second mobile telephone units communicate with each other through the cell site.

15. The system as set forth in claim 13 wherein the radio control block includes a first switch and a second switch.

16. The system as set forth in claim 15 wherein the first switch includes a plurality of ports and the second switch includes a plurality of ports.

17. The system as set forth in claim 16 wherein at least two of the plurality of ports of the first switch are connected to a transmission line through a first splitter box and at least two of the plurality of ports of the second switch are connected to a receiving line through a second splitter box.

18. The system as set forth in claim 17 wherein the transmission line and receiving line connect to the multiplexer of the first mobile telephone unit.

19. The system as set forth in claim 18 wherein the first mobile telephone unit connects to the antenna system through the transmission and receiving lines and selected ports.

20. The system as set forth in claim 19 wherein the first mobile telephone unit connects to a second antenna through the antenna system.

* * * * *